(12) United States Patent
Garland et al.

(10) Patent No.: US 6,671,671 B1
(45) Date of Patent: Dec. 30, 2003

(54) SYSTEM AND METHOD FOR TRANSMITTING DATA FROM CUSTOMER PREMISE EQUIPMENT SANS MODULATION AND DEMODULATION

(75) Inventors: Stuart M. Garland, Morton Grove, IL (US); David B. Smith, Hinsdale, IL (US); Matthew R. Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/546,352

(22) Filed: Apr. 10, 2000

(51) Int. Cl.[7] .......................... G10L 15/22; H04M 11/00
(52) U.S. Cl. ................. 704/270.1; 704/275; 379/106.3
(58) Field of Search ................................ 704/231, 251, 704/258, 270, 275, 270.1; 379/106.03, 106.04, 106.05, 106.06, 106.07, 106.08, 106.09, 106.1, 106.11, 40, 88.01, 88.03, 88.04

(56) References Cited

U.S. PATENT DOCUMENTS

| | | | | |
|---|---|---|---|---|
| 4,314,102 A | * | 2/1982 | Lowe et al. ............... 340/569 |
| 4,578,540 A | * | 3/1986 | Borg et al. ............... 379/40 |
| 5,509,054 A | * | 4/1996 | Garland ................. 379/106.09 |
| 5,699,276 A | * | 12/1997 | Roos ..................... 340/870.01 |
| 6,067,029 A | * | 5/2000 | Durston .................. 324/76.11 |
| 6,263,072 B1 | * | 7/2001 | Booton et al. ......... 379/106.09 |

* cited by examiner

Primary Examiner—Richmond Dorvil
Assistant Examiner—Martin Lerner

(57) ABSTRACT

In a system and method for the collection of alphanumeric data from Customer Premise Equipment (CPE) at the behest of an enhanced service provider (such as a utility company) requesting said data, a CPE transmits the data in the form of a synthesized voice signal, obviating the need for modems. The invention is useful for applications such as Automatic Meter Reading (AMR) and Home and Business Electronic Systems (HBES). The targeted CPE in such a system, after being connected to a remote applications server via a telephone call including "suppressed ringing," converts data collected to a standard voice signal via a voice synthesizer and transmits the voice signal to the applications server. The applications server performs a speech-to-text conversion to place the data back into its alphanumeric form.

5 Claims, 2 Drawing Sheets

US 6,671,671 B1

Figure 1:
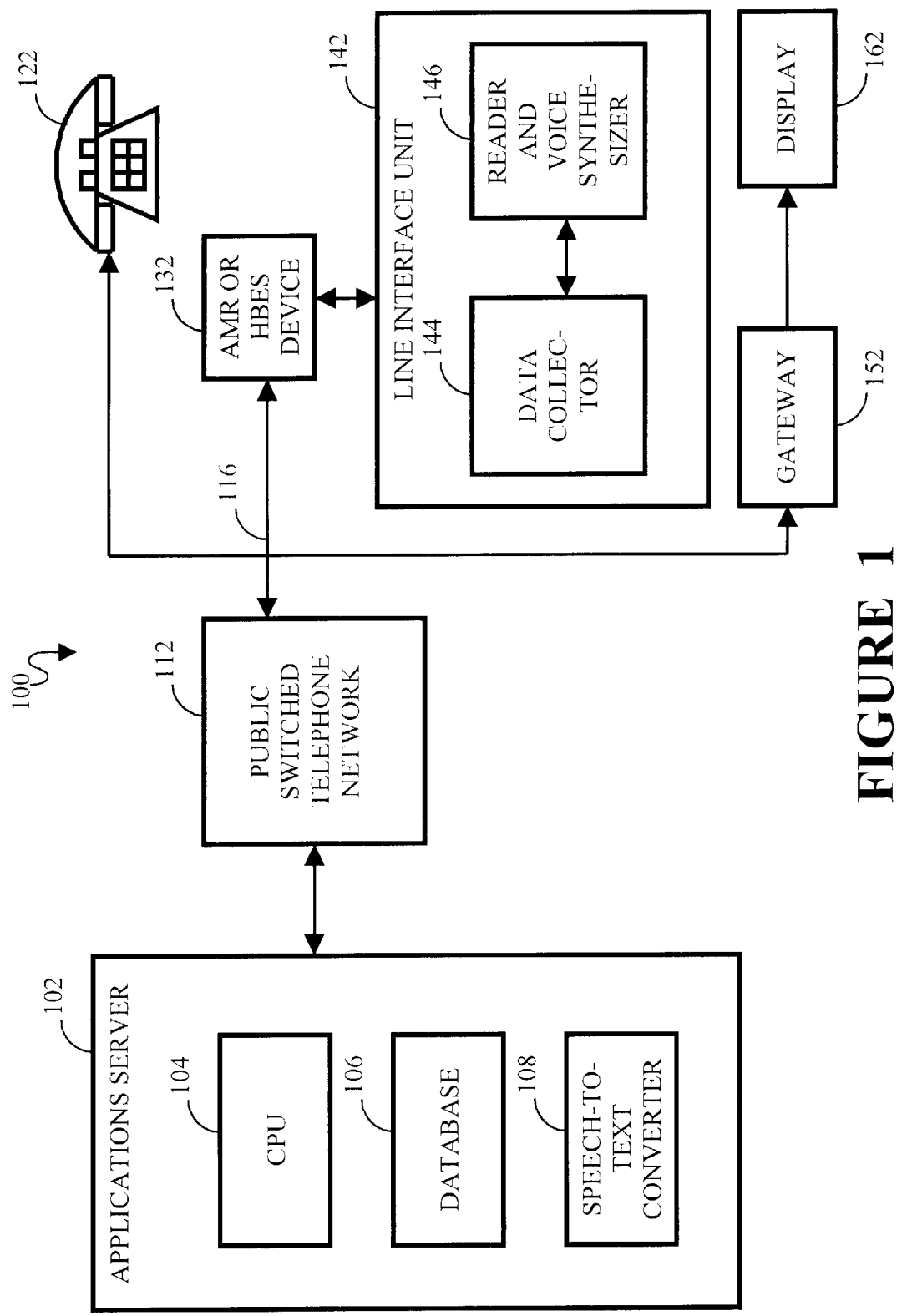

SYSTEM AND METHOD FOR TRANSMITTING DATA FROM CUSTOMER PREMISE EQUIPMENT SANS MODULATION AND DEMODULATION

BACKGROUND OF THE INVENTION

1. Field of the Invention

The present invention generally relates to Automatic Meter Reading, Home and Business Electronic Systems, and other applications requiring the uni- or bi-directional transmission of data from and/or to Customer Premise Equipment via a telephone link.

2. Background of Related Art

Automatic Meter Reading (AMR) is the remote collection and transmission of data to and from utility meters, the data being typically related to consumption and billing matters, although it need not be so limited. The entity (e.g., utility company) desiring the data can initiate a data collection operation via an application server by establishing a telecommunication link with special Customer Premise Equipment (CPE) designed to collect meter data from a meter, and the interface with the applications server.

In some instances, under the direction of the application server, the CPE collects the data from the meter, modulates the data via a modem, and then transmits it over the telecommunication link. The received data is demodulated (via a modem) and processed by the application server in a manner known in the art. In other instances, the CPE collects data without being directed to do so by an application server. It can then transmit this batch data upon request by an application server. For example, the CPE may periodically collect historical data which may later be requested by the application server in the future.

Home and Business Electronic Systems (HBES) use a related service for exchanging information with a business or residential machine or electronic device, and a remote application server (be it on or off the premises). Along with the remote control of these devices (e.g., safety devices, thermostats, appliances, etc.) HBESs can also be used to carry out remote diagnostics programs, and automatically initiate maintenance calls.

An undesirable feature of AMR, HBES and other similar systems—as practiced by the prior art—is that all data transmission devices must include (either embedded or as stand-alone units) a modem for data conversion, transmission and reception. This is true even where the amount and frequency of data transmission is small. As a result of the modem requirement, the cost of such devices and systems is often higher than is necessary, and the data call set-up time is extended.

SUMMARY OF THE INVENTION

In view of the above-identified problems and limitations of the prior art, the present invention provides a telecommunication system adapted for handling communication and data exchange, in which data is exchanged without modems. The system at least includes a telecommunication link, Customer Premise Equipment (CPE) coupled to the telecommunication link at least including a data generator, a data-to-voice converter coupled to the data generator, adapted to convert raw data into a synthesized voice signal, and a transceiver coupled to the data-to-voice converter and to the CPE, adapted to transmit voice signals representing data to the telecommunication link, and receive signals from the telecommunication link.

The system also at least includes a server at least including a voice-to-data converter adapted to convert a voice signal into raw data, and a data path establisher adapted to establish a data path between the server and the CPE via the telecommunication link, for the CPE to transmit, and the server to receive, voice signals representing data.

The present invention also provides, in a telecommunication system adapted for handling communication and data exchange, a method of data exchange. The method at least includes the steps of providing a telecommunication link, providing CPE coupled to the telecommunication link for generating data, converting raw data received from the CPE into a synthesized voice signal, and transmitting voice signals representing data to the telecommunication link.

The method also at least includes the steps of providing a server at least including a voice-to-data converter for converting a voice signal into raw data, establishing a data path between the server and the CPE via the telecommunication link, and transmitting from the CPE to the server, voice signals representing data.

BRIEF DESCRIPTION OF THE DRAWING FIGURES

Figure 2:
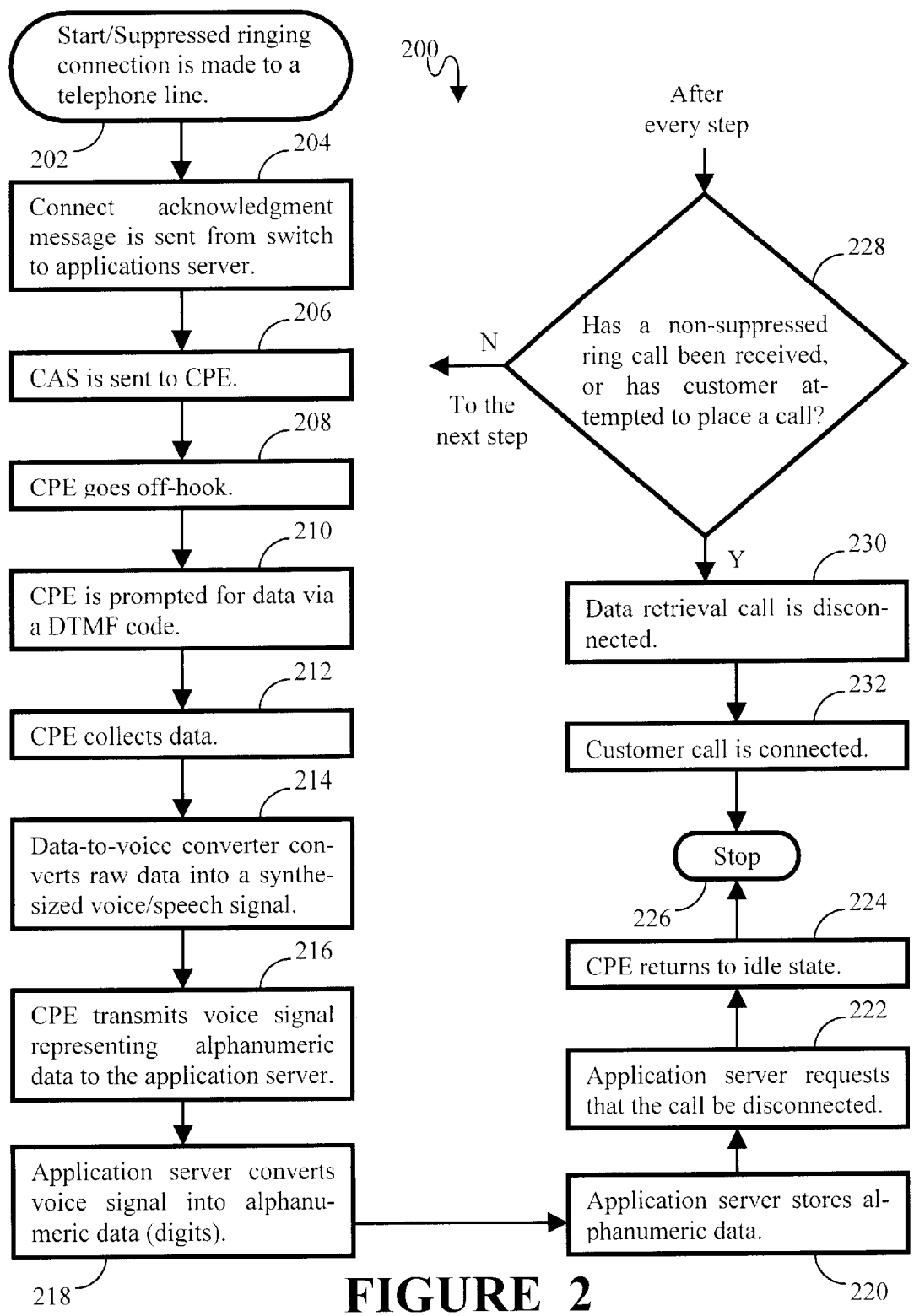

Features and advantages of the present invention will become apparent to those skilled in the art from the description below, with reference to the following drawing figures, in which:

FIG. 1 is a schematic block diagram of the present-inventive system for modem-less transmission of numeric and alphanumeric data from CPEs; and FIG. 2 is a flowchart illustrating the present-inventive method s for modem-less transmission of numeric and alphanumeric data from CPEs.

DESCRIPTION OF THE PREFERRED EMBODIMENTS

The following are among the Institute of Electrical and Electronic Engineers (IEEE) publication numbers that may be of interest to those skilled in the art regarding AMR and HBES applications: 1390; 1390.1; 1390.2; 1390.3; 1397; 1480; 1377; 1411; and 1412.

The telecommunication system 100 in FIG. 1 is capable of data exchange between an applications server 102 and special CPEs such as the one 132. In the preferred embodiment, the CPE also includes a line interface unit 142, a gateway 152, and a display, 162. While the aforementioned components are shown as part of the CPE, it should be appreciated that the components can reside outside of the CPE.

A Public Switched Telephone Network (PSTN) 112 connects the various components of the system 100 via telephone lines (such as the one 116) and telephone calls in a manner known in the art. In addition to connecting the CPE (132 et seq.), the PSTN can also connect calls to a telephone such as the one 122 in the figure for telephone communication with various services such as Call Forwarding, Call Blocking, etc.

The gateway 152 serves to connect the PSTN and the CPE where the two use different networking protocols. In the preferred embodiment, the line interface unit 142, which may be within or without the CPE, contains a data collector for collecting raw alphanumeric data from an AMR or HBES device 132. In a material departure from the prior art, the raw data is converted to a synthesized analog voice signal (e.g., a "standard," speaker-dependent human voice or other analog signal recognizable by the applications server) by a reader and voice synthesizer 146.

At the request of the applications server 102, the CPE transmits analog voice signals collected from the AMR or HBES device 132 representing the raw data. The data is not modulated prior to being sent, therefore obviating the need to include a modem in the CPE. Upon receipt of the voice signal representing the data, and under the direction of the CPU 104, the applications server 102 causes a speech-to-text converter to convert the voice signal back to alphanumeric data and store it in the database 106 as needed. Since the voice signal is unmodulated, there is no need for demodulation.

"Suppressed ringing" (also referred to as "no ring calling") is included in a telephone connection to the CPE, as described in IEEE Standard 1390. Using this approach, the telephone connection is made without an audible ring, so that the customer is unaware of the data exchange. However, the data exchange operation must cease immediately if either the customer receives a telephone call, or another CPE connected to the telephone line goes off hook when the customer attempts to place a telephone call.

FIG. 200 illustrates the basic algorithm employed by the present-inventive system for modem-less exchange of CPE data. To trigger a data exchange operation, the applications server causes the PSTN to make a suppressed ringing connection to the telephone line coupled to the targeted CPE (Step 202).

A number of hand-checking signals are sent throughout the system, including a Connect acknowledgment message from the PSTN to the applications server (Step 204). A CPE Alerting Signal (CAS) is sent to the CPE in Step 206. In response, the CPE goes offhook (Step 208). The CPE is then prompted, via a Dual Tone Multi-Frequency (DTMF) code, to transmit the specified data (Step 210).

If at any time during a data exchange operation, another Calling Party attempts to call the telephone line, or the customer attempts to place a call, the current data retrieval call is immediately disconnected, and the data exchange operation is halted until a future time when the line again becomes available, as illustrated by Steps 228, 230 and 232.

While the preferred embodiment of the present-inventive system handles attempted interruptions of data retrieval calls as described above, other approaches are also compatible. For example, when a third party attempts to call the telephone line during a data retrieval operation, he/she can receive a "busy" signal rather than being able to force the disconnection of the data retrieval call.

After the CPE collects the raw data desired by the applications server (Step 212), the data-to-voice converter converts the raw alphanumeric data into a synthesized voice/speech signal (Step 214). In the preferred embodiment, the voice signal contains a synthesized human voice (i.e., a speaker-dependent, well-known voice) easily recognizable by applications servers using the system for AMR, HBES and other services. The CPE transmits, and the applications server receives, the voice signal in Step 216. The voice data may be de-limited by a spoken word such as "comma" to provide breaks in data transmission, and to assist the voice recognition process at the server.

When the applications server receives the voice signal, its speech-to-data converter converts the standard voice heard to the digits representing the alphanumeric data collected by the CPE (Step 218). After the application stores the restored alphanumeric data, it requests that the PSTN disconnect the call (Steps 220 and 222). Upon the call being disconnected, the CPE returns to an idle state until another data exchange operation is initiated (Steps 224 and 226).

In an alternative call disconnection operation, the PSTN contains a timer which is set to expire a predetermined amount of time (e.g., 6 seconds) after the CPE makes a data transmission. Upon the expiration of the timer without a further data transmission, the PSTN automatically disconnects the call.

Variations and modifications of the present invention are possible, given the above description. However, all variations and modifications which are obvious to those skilled in the art to which the present invention pertains are considered to be within the scope of the protection granted by this Letters Patent.

For example, the present invention need not be limited to use with a PSTN, but may be self-contained within "local" systems such as Private Branch Exchanges (PBXs). The invention may also be used in conjunction with communication buses (e.g., "fire wires") linking appliances and consumer electronics products. Also, switching can be carried out by other means such as Intelligent Networks (whether or not PSTNs are involved), other Wide-Area Networks such as the Internet, as well as packet networks and digital networks.

Also, the system may employ a special voice code which includes a shorthand utterance for each of the ten digits to improve recognition. Likewise, the voice code can include special utterances which represent more complex commands. This serves to both improve command recognition and shorten the data transmission.

What is claimed is:

1. A telecommunication system adapted for handling communication and data exchange, said system comprising:
   a telecommunication link;
   Customer Premise Equipment (CPE) coupled to said telecommunication link at least comprising a data generator;
   a data-to-voice converter coupled to said data generator, adapted to convert raw data into a synthesized voice signal, said voice signal comprising voice codes representing shortened versions of numeric data,
   a transceiver coupled to said data-to-voice converter and to said CPE, adapted to transmit voice signals representing data to said telecommunication link, and receive signals from said telecommunication link;
   a server at least comprising a voice-to-data converter adapted to convert a voice signal into raw data; and
   a data path establisher adapted to establish a data path between said server and said CPE via said telecommunication link, for said CPE to transmit, and said server to receive, voice signals representing data.

2. In a telecommunication system adapted for handling communication and data exchange, a method of data exchange comprising the steps of:
   providing a telecommunication link;
   providing Customer Premise Equipment (CPE) coupled to said telecommunication link for generating data;
   converting raw data received from said-CPE into a synthesized voice signal, said voice signal comprising voice codes representing shortened versions of numeric data,
   transmitting-voice signals representing data to said telecommunication link;
   providing a server at least comprising a voice-to-data converter for converting a voice signal into raw data;

establishing a data path between said server and said CPE via said telecommunication link; and transmitting from said CPE to said server, voice signals representing data.

3. The method in claim 2, wherein said telecommunication link is established via a telephone call.

4. The method in claim 3, further comprising the steps of:

via said CPE, transmitting a disconnect signal; and disconnecting said telephone call in response to said disconnect signal.

5. The method in claim 3, further comprising the steps of:

resetting a timer after each data transmission from said CPE; and upon said timer reaching a predetermined count, disconnecting said telephone call.

* * * * *